United States Patent [19]

Haas, Sr. et al.

[11] Patent Number: 4,580,489
[45] Date of Patent: Apr. 8, 1986

[54] APPARATUS FOR CONTINUOUSLY MAKING AN ENDLESS WAFER LAMINATE OF UNIFORM WIDTH, CONSISTING OF INDIVIDUAL WAFER SHEET LAYERS AND INTERVENING CREAM LAYERS

[76] Inventors: Franz Haas, Sr., Gerstlgasse 25, A-1210 Wien; Franz Haas, Jr., Kreuzgasse, A-2100 Leobendorf; Johann Haas, Seitweg 4, A-3400 Klosterneuburg, all of Austria

[21] Appl. No.: 703,081

[22] Filed: Feb. 19, 1985

Related U.S. Application Data

[62] Division of Ser. No. 432,931, Sep. 29, 1982, Pat. No. 4,518,617.

[30] Foreign Application Priority Data

May 20, 1981 [AT] Austria .................................. 2266/81
May 13, 1982 [AT] Austria .................................. 1938/82

[51] Int. Cl.$^4$ ........................ A21D 13/00; A23G 3/00
[52] U.S. Cl. .................................. 99/450.4; 99/450.7
[58] Field of Search ........................... 99/450.1–450.7, 99/443 C, 644; 426/274, 275, 94, 103

[56] References Cited

U.S. PATENT DOCUMENTS 4,361,082 11/1982 Haas, Sr. et al. .................. 99/450.4
4,440,072 4/1984 Haas, Sr. et al. .................. 99/450.4

Primary Examiner—Timothy F. Simone
Attorney, Agent, or Firm—Kurt Kelman

[57] ABSTRACT

Process and apparatus for continuously making an endless wafer laminate which has a uniform width and consists of individual wafer sheet layers and intervening cream layers. In order to increase the production rate of such wafer laminate while maintaining a high quality, the invention teaches that each edge of the wafer sheets for the lowermost wafer sheet layer is registered and the deposition of the wafer sheets for the remaining wafer sheet layers is controlled by the succession of said wafer sheet edges. The butt joints of the wafer sheets in the individual wafer sheet layers are offset relative to each other in the direction of conveyance or are arranged exactly in register. For registering the wafer sheet edges, the edges of consecutive wafer sheets are displaced or pivotally moved relative to each other or pulled apart to form a gap. Each wafer sheet for the additional wafer sheet layers is moved to a waiting position in the wafer sheet applicator, which succeeds the coating head for applying a cream layer, and in dependence on the succession of the wafer sheet edges of the lowermost wafer sheet layer is applied to the adjacent cream layer and is then forced against the same. The resulting wafer laminate is used as an intermediate product for making small wafer slices.

41 Claims, 17 Drawing Figures

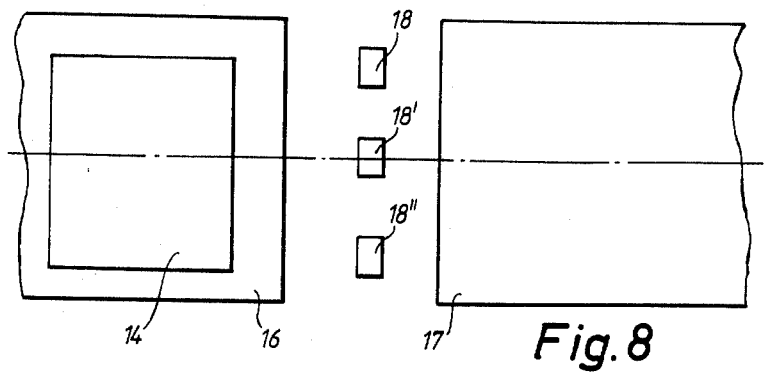
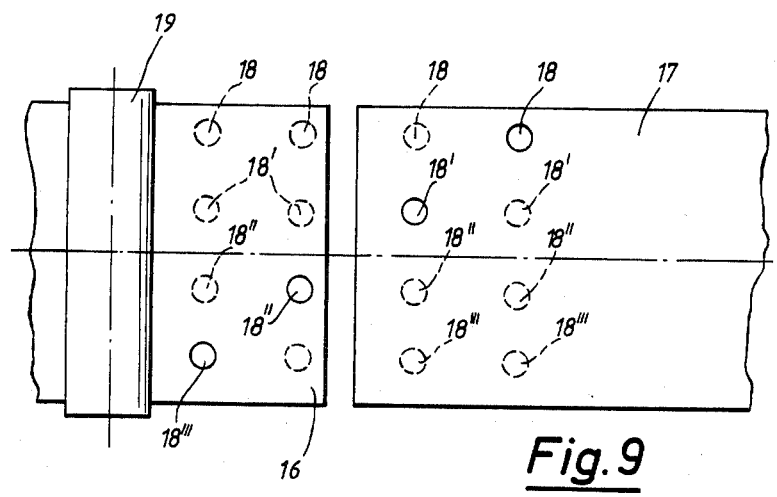
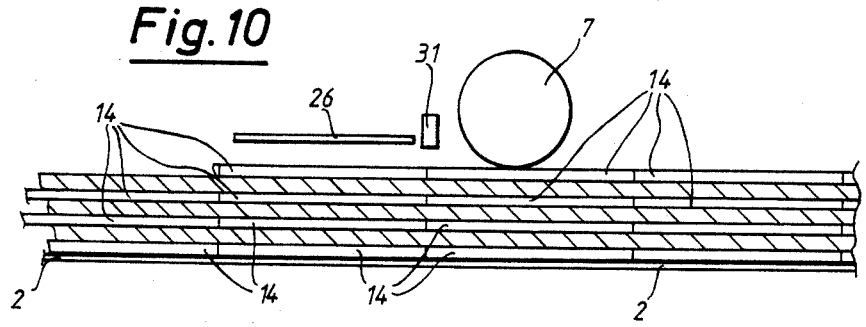

APPARATUS FOR CONTINUOUSLY MAKING AN ENDLESS WAFER LAMINATE OF UNIFORM WIDTH, CONSISTING OF INDIVIDUAL WAFER SHEET LAYERS AND INTERVENING CREAM LAYERS

This is a division of our copending application Ser. No. 432,931, filed Sept. 29, 1982, now U.S. Pat. No. 4,518,617.

This invention relates to an apparatus for continuously and particularly fully automatically making an endless wafer laminate of uniform width, consisting of individual wafer sheet layers and one or more composition layers, preferably cream layers.

Various baked wafer products made by machine are known, inter alia, in the food-processing industry. These baked wafer products are placed on the market in a filled or unfilled state and are generally known as luxury foods. Such products of the wafer-baking industry are, e.g., wafer cones, wafer cups, wafer plates, flat wafer discs, low hollow wafers, hollow sticks, wafer rolls, icecream cones, filled wafers, icecream wafers, small filled wafer sticks, wafer slices and the like. These baked wafer products made by baking a wafer dough are crisp and brittle and break easily. They are baked to be as dry as possible and have a very low moisture content.

The various baked wafer products can be made in various ways. Some wafer products are baked in their final shape. This applies, e.g., to wafer cones, wafer cups, wafer discs, low hollow wafers and the like.

In the manufacture of other baked wafer products, a wafer sheet or an endless wafer strip is baked first and is given its final shape when it is still soft after the baking operation. In that final shape the baked wafer product is permitted to cool and to assume a crisp and brittle consistency. Examples of such baked wafer products are sugar-containing icecream cones, hollow sticks, sugar-containing wafer rolls and the like.

Other kinds of baked wafer products are made in that a plurality of wafer sheets are baked, cooled, coated with cream, and stacked to form a wafer block. That creamfilled wafer block is subsequently cut into small handy pieces of uniform size, which are then packaged in units consisting of one or more pieces, possibly in vacuum packages, and are placed on the market in that form.

Various baked wafer products may be provided with coating consisting, e.g., of sugar or chocolate, or may contain various filling materials, such as icecream, various others creams, chocolates or the like.

The wafer products described hereinbefore differ from waffles, which are usually baked by housewives in waffle irons and constitute a soft baked product, which is similar to rolls or pancakes. These waffles made by housewives do not resemble at all the above-mentioned baked wafer products of the wafer industry as regards consistency and use.

Those industrially made wafers which are baked in their final shape, such as wafer cones, wafer cups, wafer figures and the like, on the one hand, and individual wafers, which are coated with cream and subsequently assembly to form a wafer product, such as flat wafers, wafer sheets, shallow hollow wafers, or the like, on the other hand, are made in automatic wafer-baking ovens.

In the making of small cream-filled wafer slices which are sold as slice packages, in which a plurality of wafer slices are juxtaposed and/or arranged in a row, it is known to form a blocklike intermediate product by assembling the wafer sheets which have come from an automatic wafer-baking oven and coated with cream. Such an intermediate product is constituted by the wafer blocks or wafer books made on wafer sheet-coating machines. Another intermediate product of that kind is constituted by an endless wafer laminate, which consists of individual wafer sheet layers and intervening cream layers and in which the several wafer sheets are arranged in bond like bricks in a masonry wall so that said wafer laminate can be described as a bondtype wafer sheet laminate.

In the making of wafer blocks it is known from Austrian Patent Specification No. 329,479 to provide a plurality of wafer sheet applicators above a common conveyor belt and to provide a coating head between adjacent wafer sheet applicators. The conveyor belt has protruding tines, which are higher than the wafer block to be formed and have a spacing which exceeds the length of the wafer block. In each wafer sheet applicator a wafer sheet is pulled out of a wafer sheet magazine at the lower end thereof and is introduced into a calibrated downcomer, which terminates above the conveyor belt and in which each wafer sheet slowly descends in a substantially horizontal orientation to a receiving bottom of said downcomer, and is subsequently pulled from said receiving bottom by the tines of the conveyor belt so that the wafer sheet then lies between two successive rows of tines on the conveyor belt or on cream-coated wafer sheets previously applied to said belt. Each of these wafer sheets is separated from the preceding and succeeding wafer sheets by respective rows of tines. A first coating head then applies a cream coating in a film-coating process on each of these wafer sheets. In the next wafer sheet application each row of tines removes a wafer sheet from the downcomer in the manner described hereinbefore so that said wafer sheet comes to lie on the cream coating of the next lower cream-coated wafer sheet and is aligned with the latter only by the rows of tines. These wafer sheets are then forced against the cream coating by a pressure roller. These process steps are repeated until a wafer block having the desired number of layers has been formed. As a result of the process, a series of water blocks which are provided with cream layers and separated by rows of tines are formed on the conveyor belt.

In that known process the time required to form each wafer block depends on the time required for the movement of each wafer sheet from the wafer sheet magazine through the downcomer onto the cream coating on the next lower cream-coated wafer sheet because only a single wafer sheet can be introduced into the downcomer at a time after the preceding wafer sheet has reached the bottom of the downcomer. The wafer blocks are then processed to form individual wafer slices having a predetermined length and width and the same height as the wafer blocks. For this purpose the wafer block is severed. Owing to the size ratio of the wafer slice to the wafer block, only a certain number of wafer slices can be cut from a wafer block and narrow marginal portions which constitute waste remain at all edges of the wafer block in a size which depends on the size of the wafer slices.

In connection with the making of a wafer laminate consisting of a plurality of wafer sheet layers and intervening cream layers, particularly a bond-type wafer sheet laminate, it is known from German Patent Specification No. 948,864 that the wafer sheets baked in standard size in an automatic wafer-baking oven can be applied by hand or automatically on a table or a supporting conveyor element to form a series of longitudinally and, if desired, transversely abutting wafer sheets, which then constitute a wafer sheet layer of uniform width. A layer of filling material can then be applied in a conventional manner to the resulting closed wafer sheet layer and another wafer sheet layer can be applied by hand on said filling material layer in a third process step. The joints in the upper wafer sheet layer are staggered from those in the lower layer like the joints between bricks in a masonry wall. To form a wafer laminate or bond-type wafer laminate having a plurality of filling material layers, another layer of filling material is applied to the uppermost wafer sheet layer and is covered with a new wafer sheet layer. These process steps are repeated until filling material layers in the desired number have been formed. To perform that known process, each coating device is succeeded in the direction of travel of the conveyor belt by a worker, by whom consecutive new wafer sheets are applied to and forced against the layer of filling material. That process has the disadvantage that the application and forcing by hand requires special care and attention by the workers and nevertheless a relatively large quantity of waste will be obtained if the wafer sheets are not superimposed in exact register or are not uniformly forced down. The productive capacity is very low because the velocity of the belt is limited by the ability of the worker and the time required for the application by hand. There is a frequent breaking of individual wafer sheets, particularly at the edges and corners.

It is an object of the invention to avoid the disadvantages which have been pointed out and to provide an apparatus which permit a continuous making of a wafer laminate of uniform quality at a high production rate without any manual contact with the wafer sheet.

In our copending application, we have claimed a process for the continuous and particularly fully automatic making of an endless wafer laminate of uniform width in that individual wafer sheet layers and one or more composition layers, particularly cream layers, are superimposed, wherein a first lowermost wafer sheet layer consisting of individual, consecutive wafer sheets is formed first on a conveyor belt or the like, on which adjacent edges of said wafer sheets preferably adjoin, whereafter a composition layer is applied to the previously formed wafer sheet layer and another wafer sheet layer consisting of a plurality of consecutive wafer sheets, the adjacent edges of which preferably adjoin each other, is applied to and subsequently forced against said composition layer, until the desired number of wafer sheet layers and composition layers has been obtained, and wherein the uppermost wafer sheet layer of the wafer laminate is also provided with a composition layer, if desired, which process is characterized in that the individual wafer sheets for the first, lowermost wafer sheet layer are successively supplied to the conveyor belt in a row, one edge of each wafer sheet, which edge extends transversely to the direction of conveyance, is registered by a sensor, each wafer sheet for each additional wafer sheet layer is moved to a waiting position disposed above the uncovered uppermost composition layer of the previously formed portion of the wafer laminate, and each wafer sheet remaining in its waiting position is dropped onto the uppermost composition layer, possibly with a delay, when the sensor registers an edge of the wafer sheets for the first, lowermost wafer sheet layer.

The process according to the invention permits the making of a continuous endless wafer laminate at a high production rate, which is much higher than would be possible if the wafer sheets were applied by hand. The resulting wafer laminate has a much more uniform structure because the succession of the several wafer sheets in each wafer sheet layer depends on the succession of the wafer sheet edges of the wafer sheets for the first, lowermost wafer sheet layer, which edges are registered by the sensor. This will result in a highly precise succession of the several wafer sheets in such a manner that the leading edge of each wafer sheet closely succeeds the trailing edge of the preceding wafer sheet and this is accomplished without a need for a touching of the wafer sheets with the hand. Another advantage afforded by the process according to the invention resides in that the individual wafer sheets of each additional wafer sheet layer are uniformly deposited on the next underlying composition layer so that the wafer sheet joints in each wafer sheet layer are provided in a uniform succession throughout the length of the resulting wafer laminate like those of the first wafer sheet layer.

Another advantage of the process according to the invention resides in that the wafer laminate must be trimmed only at its longitudinal edges during its further processing.

According to a further feature of the invention a process particularly for making an endless bond-type wafer sheet laminate, is characterized in that the wafer sheets for at least one of the additional wafer sheet layers are dropped from their waiting position onto the underlying composition layer only when the leading edge of that wafer sheet of the first, lowermost wafer sheet layer which corresponds to the wafer sheet to be dropped, which remains in waiting position, has moved past the vertical projection on the conveyor belt of the leading edge of the wafer sheet which remains in waiting position so that the wafer sheet which has been dropped from the waiting position will lie on the adjacent composition layer in a position in which said dropped sheet is spaced from the associated wafer sheet of the first, lowermost wafer sheet layer by a distance which corresponds at least to the distance which corresponds at least to the distance of fall. This ensures that the joints between the wafer sheets in each additional wafer sheet layer will be arranged with a precise, uniform spacing, which corresponds to that in the first wafer sheet layer, and said spacing of the wafer sheets of the respective wafer sheet layer from those of the first, lowermost wafer sheet layer will be maintained throughout the length in which the wafer laminate is made.

The bond-type wafer sheet laminate may be cut into individual endless wafer bars, to which, e.g., nougat compositions, Turkish delight or the like may be applied. The thus coated wafer bars are then cut into individual pieces having a predetermined length and may then be coated, e.g., with chocolate. The bond-type endless wafer sheet laminate which is made continuously in accordance with the invention affords a number of advantages in the further processing. For instance, less waste is obtained. The product length in the direction of conveyance is not limited and can easily be altered at any time; such alteration will not increase the waste.

According to a further feature of the invention a wafer sheet which is in waiting position and intended for an additional wafer sheet layer is dropped only after an interval of time which corresponds to its spacing from the wafer sheet in the lowermost wafer sheet layer.

If the process is carried out in that manner, the place at which the composition layer is applied to each additional wafer sheet layer can be selected independently of the spacing of the wafer sheets of that wafer sheet layer from the wafer sheets of the first, lowermost wafer sheet layer so that the several composition layers can be applied to the additional wafer sheet layers in a quicker succession or in another succession than would correspond to the spacing of the wafer sheets in each wafer sheet layer from each other and from the first, lowermost wafer sheet layer.

According to another feature of the invention a process particularly for making an endless series of wafer blocks connected to form an endless wafer laminate is characterized in that the wafer sheets remaining in their respective waiting positions and intended for the additional wafer sheet layers are deposited on the adjacent composition layer of the previously formed portion of the wafer laminate substantially in register with the associated wafer sheets of the first, lowermost wafer sheet layer so that the wafer sheet joints of the several wafer sheet layers are in register. In that process, individual wafer sheets joined only by the composition layers disposed between the wafer sheet layers and, if desired, by webs of composition forming in the registering wafer sheet joints can be made in an endless sequence to form an endless wafer laminate so that a much higher number of wafer blocks can be obtained at a given production speed than in the known wafer sheet-coating machine, in which one wafer block is made after the other.

According to another feature of the invention, each additional wafer sheet layer is formed in that each wafer sheet intended for that wafer sheet layer is first applied to the adjacent composition layer in such a manner that a gap is left between the leading edge of that wafer sheet and the trailing edge of the preceding wafer sheet and the wafer sheet is subsequently displaced on the composition layer until the gap is closed and the leading edge of the wafer sheet adjoins the trailing edge of the preceding wafer sheet. In that process, an overlap of the adjacent edges of successive wafer sheets in a given wafer sheet layer is prevented and a contact between successive wafer sheets will be ensured even if the wafer sheets differ in length in the direction of conveyance so that length differences between wafer sheets will be compensated.

According to a further feature of the invention the wafer sheets for the first, lowermost wafer sheet layer having adjacent edges adjoining each other are first guided in a layer which is offset across the direction of conveyance from the path of the complete wafer laminate and are then laterally displaced into the path of the complete wafer laminate so that two consecutive wafer sheets are laterally offset from each other and one of the two adjoining wafer sheet edges protrudes laterally from the other, and at least one sensor registers the protruding portion of one of the two wafer sheet edges. That guidance of the wafer sheets for the first wafer sheet layer ensures that the leading and trailing edges of the wafer sheets will adjoin each other as the wafer sheets are conveyed, that the successive wafer sheet joints will be reliably registered by the sensor before the composition layer is applied to the first wafer sheet layer and an exact succession of the wafer sheets which are deposited in the other wafer sheet layers on the respective composition layer is also ensured.

Another variant of the process according to the invention is characterized in that the wafer sheets for the first, lowermost wafer sheet layer are first guided in the plane of conveyance of the complete wafer laminate while their adjacent edges adjoin, and the individual wafer sheets are then successively lifted from the plane of conveyance of the complete wafer laminate so that the wafer sheet lifted in part from the plane of conveyance is turned or displaced at right angles to the direction of conveyance at least at one of its edges which adjoin edges of the adjacent wafer sheets.

It will be of advantage that that portion of the edge of a given wafer sheet which has been turned or lifted from the plane of conveyance can be reliably detected by the respective sensors whereas the wafer sheet need not be removed in the direction of conveyance from the adjacent and adjoining wafer sheets.

For a detection of the edges of each wafer sheet, the invention calls for the generation of a narrow, wedge-shaped gap between two consecutive wafer sheets. This is accomplished in accordance with the invention by a process variant which is characterized in that the wafer sheets for a first, lowermost wafer sheet layer are first guided in the plane of conveyance of the complete wafer laminate at an acute angle to the path of said laminate and are then individually turned into the path of the complete wafer laminate and guided in said path with adjacent edges adjoining each other only two consecutive wafer sheets are turned relative to each other so that a narrow, wedge-shaped gap is formed, and at least one sensor registers one of the two wafer sheet edges which define the wedge-shaped gap.

In another variant of the process according to the invention the wafer sheets for the first, lowermost wafer sheet layer are first guided so that they are offset in height from the path of the complete wafer laminate and are then individually displaced in height into the path of the complete wafer laminate so that the adjoining wafer sheet edges of two consecutive wafer sheets are vertically spaced apart, the wafer sheets are then guided in the path of the complete wafer laminate with their adjacent edges adjoining each other and at least one sensor registers the trailing edge of the wafer sheet which has already been displaced in height or the leading edge of the wafer sheet which has not yet been displaced in height.

Two consecutive wafer sheets can be upwardly or downwardly displaced relative to each other. An upward displacement will be desirable if the trailing edge of the lifted wafer sheet is to be registered by the respective sensor. The lowering of the wafer sheet permits the registering of the leading edge of the wafer sheet which has not yet been lowered.

Another variant of the process according to the invention is characterized in that the wafer sheets for the first, lowermost wafer sheet layer are first conveyed in the path of the complete wafer laminate at a higher speed than the complete wafer laminate and are spaced appart in the direction of conveyance as they are thus conveyed and before the application of the composition layer are braked until they form the first, lowermost wafer sheet layer, in which their adjacent edges adjoin, each wafer sheet arrives at the trailing wafer sheet of first, lowermost wafer sheet layer and the trailing edge of said just arriving wafer sheet is registered by at least one sensor. That variant will be of special advantage if the spacing of the wafer sheets for the first, lowermost wafer sheet layer substantially corresponds to the difference between the velocities of conveyance of said first, lowermost wafer sheet layer and of the complete wafer laminate.

According to another feature of the invention, the wafer sheets for the first, lowermost wafer sheet layer are first conveyed in succession and in spaced apart relation at a higher speed than the complete wafer laminate, said wafer sheets are then braked until their adjacent edges adjoin so that the wafer sheets form a queue, whereafter only the leading wafer sheet of said queue wafer sheets is accelerated for a short time so that a gap is formed between said leading wafer sheet and the next succeeding wafer sheet, the accelerated wafer sheet is moved faster than the queue of wafer sheets, and before the application of the composition layer those wafer sheets which move faster than the queue of wafer sheets are braked until they form the first, lowermost wafer sheet layer with their adjacent edges adjoining, wherein each accelerated wafer sheet arrives at the trailing wafer sheet of the first, lowermost wafer sheet layer, and at least one sensor registers the leading edge and/or the trailing edge of each accelerated wafer sheet or the trailing edges of that wafer sheet which is just arriving at the trailing wafer sheet of the first, lowermost wafer sheet layer, or the leading edge of the queue of wafer sheets.

That process variant affords the advantage that the individual wafer sheets can space any desired distance apart because any fluctuation in the feeding of the wafer sheets will be compensated. In the making of a bond-type wafer sheet laminate, another advantage resides in that the extent to which the wafer sheet joints in all additional wafer sheet layers are offset from those in the first, lowermost wafer sheet layer can be adjusted as desired by the selection of the acceleration.

According to another feature of the invention, the accelerated wafer sheets are moved at the same speed as the wafer sheets for the first, lower wafer sheet layer, which are spaced apart as they are conveyed at a higher speed than the complete wafer laminate.

According to another feature of the invention, the braked wafer sheets of the queue of wafer sheets are moved at the same speed as the complete wafer laminate. This will ensure that the feeding of the wafer sheet will correspond exactly to the progressive formation of the wafer laminate.

For an exact control of the deposition of the wafer sheets of each wafer sheet layers, the invention teaches that the wafer sheets supplied for the first, lowermost wafer sheet layer move in succession past a plurality of sensors, which are associated with respective waiting positions for the wafer sheets of the additional wafer sheet layers, and the wafer sheet remaining in waiting position is not dropped onto the adjacent composition layer until the sensor associated with that waiting position registers an edge of the wafer sheets for the first, lowermost wafer sheet layer.

To avoid an adverse effect on the sequences of wafer sheets by damaged wafer sheet edges, it is a feature of the invention that the wafer sheets supplied for the first, lowermost wafer sheet layer move past a plurality of juxtaposed sensors, which register in each wafer sheet an edge thereof which is transverse to the direction of conveyance and are associated with all waiting positions.

A further feature of the invention resides in that the leading edges of the wafer sheets are registered by sensors and the wafer sheets remaining in the respective waiting positions are dropped, preferably at the same time, when one of the sensors registers as the first sensor the leading edge of a wafer sheet for the first, lowermost wafer sheet layer.

This practice will afford the advantage that irregular leading edges of the wafer sheets will not result in a shifting of the wafer sheet joints.

According to another feature of the invention, the trailing edges of the wafer sheets are registered by the sensors and the wafer sheets remaining in respective waiting positions are dropped, preferably at the same time, when the last sensor has registered the trailing edge of a wafer sheet for the first, lowermost wafer sheet layer whereas all other sensors have previously registered that trailing edge.

In that variant of the process, any irregularity of the traling edges of the wafer sheets will not influence the formation of the wafer laminate.

Another variant of the process according to the invention is characterized in that the wafer sheets supplied for the first, lowermost wafer sheet layer are moved in succession past sensors arranged in groups, which are associated with respective waiting positions for the wafer sheets of the additional wafer sheet layers.

In that process variant an irregularity of the edges of the wafer sheets for the first, lowermost wafer sheet layer can be taken into account so that the deposition of the wafer sheets in all additional wafer sheet layers to the adjacent composition layer will not be influenced by such irregularity.

In accordance with the invention the leading edges of the wafer sheets may be registered by sensors and a wafer sheet remaining in its waiting position may be dropped when one sensor of the group associated with that waiting position registers as the first sensor the leading edge of a wafer sheet for the first, lowermost wafer sheet layer.

Alternatively, the trailing edges of the wafer sheets may be registered by sensors and a wafer sheet remaining in waiting position may be dropped only when the last sensor of the group associated with that waiting position registers the trailing edge of a wafer sheet for the first, lowermost wafer sheet layer whereas all remaining sensors of that group have previously registered that trailing edge.

According to another feature of the invention the wafer sheets for the additional wafer sheet layers, which wafer sheets remain in respective waiting positions, are dropped at the same time as soon as the sensor registers an edge of one of the wafer sheets for the first, lowermost wafer sheet layer.

As a result, those wafer sheets which in any additional wafer sheet layer succeed the wafer sheets which have previously been applied to the adjacent composition layer will be applied to that composition layer at the same time.

The invention provides apparatus which serves to carry out the process and comprises a conveyor belt for the wafer laminate, the first, lowermost wafer sheet layer of which lies on said conveyor belt, and a plurality of coating heads, which succeed each other in the direction of conveyance and are disposed above said conveyor belt and serve to apply respective composition layers to respective wafer sheet layers of the wafer laminate, and pressure roller for acting on respective wafer sheet layers of the wafer laminate, which pressure rollers preferably succeed respective coating heads. That apparatus is characterized in that the conveyor belt is preceded by a primary feeder which is provided with at least one sensor and serves to supply the wafer sheets of the first, lowermost wafer sheet layer, a wafer sheet applicator for applying wafer sheets of each additional wafer sheet layer to the adjacent composition layer succeeds each coating head and precedes each pressure roller succeeding said coating head, in the direction of conveyance, said applicator comprises a waiting position for the wafer sheets and a wafer sheet feeder for feeding successive wafer sheets to the waiting position and, if desired a common conveyor line for supplying the wafer sheets of all additional wafer sheet layers of the wafer laminate is provided and is common to the wafer sheet feeders of all wafer sheet applicators and preferably forms a wafer sheet supply, and the conveyor line and the primary feeder are preferably connected to common wafer sheet supply means.

This design according to the invention ensures that in response to the signals delivered by one or more sensors for detecting the wafer sheet edges each of the wafer sheet applicators will apply a wafer sheet to the adjacent composition layer when the trailing edge of the preceding wafer sheet has just moved past the waiting position of the wafer sheet applicator and that each wafer sheet which has been applied to the composition layer will immediately be forced against said composition layer under constant pressure.

If the apparatus according to the invention comprises a common conveyor line for all wafer sheet feeders of the several wafer sheet applicators, the wafer sheets for all additional wafer sheet layers may be continually supplied from one or more wafer-baking ovens. Said wafer-baking ovens may differ from those which supply the wafer sheet for the first, lowermost wafer sheet layer.

Alternatively, the conveyor line leading to the wafer sheet feeders of the wafer sheet applicators and the primary feeder for supplying the wafer sheets of the first, lowermost wafer sheet layer may be connected to common wafer sheet supply means. That design will be particularly desirable if the wafer sheets for all wafer sheet layers from one or more wafer-baking ovens are combined on a single conveyor line before being used in making a wafer laminate.

According to a further feature of the invention, the wafer sheet applicator comprises lateral guide bars, which are preferably provided in the wafer sheet feeder and define the position of the wafer sheets in the waiting position, a forward stop, which succeeds the wafer sheet feeder and defines the waiting position in the direction of conveyance, and a wafer sheet-depositing device, which moves each wafer sheet from the waiting position to the adjacent composition layer.

That design ensures that each wafer sheet in a waiting position will be precisely arranged relative to the adjacent composition layer of the wafer laminate so that each of the wafer sheets which are successively applied by the wafer sheet applicator to the same composition layer will have the same position relative to the composition layer.

According to a further feature of the invention the wafer sheet-depositing device comprises two fingers or retaining plates or the like, which support the wafer sheets in waiting position above the adjacent composition layer and which can be pulled out of the region of the waiting position across the direction of conveyance of the conveyor belt.

This feature will result in a particularly simp design of the wafer sheet-depositing device, which requires only such a small space that it can be disposed very close to the adjacent composition layer.

To permit an exact adjustment of each waiting position and of the offset which is desired in each case, a feature of the invention resides in that the forward stop extends across the direction of conveyance of the conveyor belt and is adjustable in the direction of conveyance.

To permit an exact lateral positioning of each wafer sheet in its waiting position it is a feature of the invention that the lateral guide bars are movable from a receiving position, in which their spacing across the direction of conveyance exceeds the corresponding dimension of the wafer sheet, to a locating position, in which their spacing across the direction of conveyance is substantially as large as the corresponding dimension of the wafer sheet and in which the lateral guide bars locate the sides of the wafer sheets in the waiting position.

To ensure that the wafer sheets in the waiting position will be exactly located in the direction of conveyance, it is a feature of the invention that the forward stop and the rear stop are movable from a receiving position, in which their spacing in the direction of conveyance exceeds the corresponding dimension of the wafer sheet, to a locating position, in which their spacing in the direction of conveyance is substantially as large as the corresponding dimension of the wafer sheets and in which the stops locate the ends of the wafer sheets in the waiting position.

According to a further feature of the invention, the lateral guide bars are provided with projections, which extend laterally below the wafer sheets which remain in the waiting position, the lateral guide bars are pivoted on axes which are parallel to the direction of conveyance, and the wafer sheet-depositing device is formed by the pivoted lateral guide bars.

According to another feature of the invention the pressure roller which succeeds the wafer sheet applicator has a peripheral velocity which exceeds the velocity at which the wafer laminate is conveyed. Owing to that design, a gap formed between two consecutive wafer sheets as they are deposited on the adjacent composition layer will be closed immediately after the application of the wafer sheet and before the latter has been entirely forced onto the composition layer. This result can also be achieved by another feature of the invention, which resides in that a spiked roller is provided which succeeds the wafer sheet-depositing device and is engageable with the applied wafer sheet and preferably comprises only one row of spikes.

According to another feature of the invention the pressure applied by the pressure roller to superimposed wafer sheet edges of consecutive wafer sheets overcomes the local strength of the wafer sheet edges. Owing to that design any doubling of the edges of two consecutive wafer sheets of a wafer sheet layer will be eliminated in that the wafer sheet edges are compressed to substantially one wafer sheet thickness so that any wafer sheet applied in a wrong position will not disturb the structure of the bond-type wafer laminate.

Also in accordance with the invention the primary feeder comprises a transport belt, which precedes the conveyor belt, a lateral guide for the wafer sheets is disposed above the transport belt and is laterally offset along the transport belt from the path of the complete wafer laminate and extends over the conveyor belt, that portion of the lateral guide which extends above the conveyor belt carries a wedge, which protrudes laterally into the path of the wafer sheets and has across the direction of conveyance a dimension which corresponds to the lateral offset of the path of the wafer sheets on the transport belt from the path of the complete wafer laminate on the conveyor belt, and at least one sensor is disposed above the path of the wafer sheet corners adjacent to the lateral offset thereof. If a wedge is provided which protrudes into the path of the wafer sheets which adjoin at their adjacent edges, the wedge surface will control the velocity at which the wafer sheets moving past the wedge are displaced across the direction of conveyance, and the extent of the wedge across the direction of conveyance will determine the extent of the displacement of the wafer sheets across the direction of conveyance. As a result, the path of the wafer sheets before the wedge can be offset from the path of the complete wafer laminate to such an extent that the lateral displacement of the adjoining wafer sheet edges which is due to the offset is sufficient to ensure a reliable detection of the wafer sheet edges by one or more sensors.

Also in accordance with the invention the primary feeder comprises three consecutive conveyors, which precede the conveyor belt, the second of said conveyors in the direction of conveyance has the same velocity of conveyance as the conveyor belt, the two other conveyors have higher velocities of conveyance, at least one holding-down roller for the wafer sheets is disposed at least above the second conveyor and above the conveyor belt, the holding-down roller of the second conveyor brakes the wafer sheets so that a queue of wafer sheets will be formed on the first conveyor, and at least one sensor is provided between the holding-down roller of the second conveyor and the holding-down roller of the conveyor belt. Owing to that design of the apparatus according to the invention the second conveyor will brake each wafer sheet so that the wafer sheets on the first conveyor will be pushed together so that they form a queue of wafer sheets and their edges engage, the first wafer sheet conveyor moves under said queue of wafer sheets, and each wafer sheet transferred from the second conveyor to the third conveyor is accelerated by the latter, which moves at a higher velocity, so that a gap is opened between that wafer sheet and the next following wafer sheet, which is still on the second conveyor. Said gap permits an exact registering of the wa er sheet edges defining the gap by the sensor or sensors. The third conveyor then delivers each wafer sheet directly to that conveyor belt above which the several coating heads are arranged. Since the third conveyor has a higher velocity of conveyance than the conveyor belt, the several wafer sheets which have moved past the photoelectric detector will be pushed together so that their edges engage because the wafer sheets are braked by the conveyor belt. This will result in a wafer sheet layer in which the edges of the wafer sheets adjoin each other. Because the second conveyor and the conveyor belt have the same velocity of conveyance, it is ensured that a gap between two consecutive wafer sheets will always be formed adjacent to the second and third conveyors and will be closed adjacent to the third conveyor and the conveyor belt.

According to a further feature of the invention the primary feeder comprises a conveyor which precedes the conveyor belt and defines for the wafer sheets a conveyor path which is vertically offset from the conveyor path of the conveyor belt, and at least one sensor is provided in the region of the vertical offset. The gap which is due to the vertical offset is of special advantage with sensors consisting of photoelectric detectors.

For another variant of the formation of a gap between two consecutive wafer sheets, it is a feature of the invention that the primary feeder comprises a conveyor which precedes the conveyor belt and defines for the wafer sheets a conveyor path which extends in the same plane as and at an angle to the conveyor path of the conveyor belt, and at least one sensor is provided adjacent to the adjoining ends of the conveyor belt and wafer sheet conveyor.

To permit a detection of the wafer sheet edges even when no gap is formed between consecutive wafer sheets, it is a feature of the invention that the primary feeder comprises a conveyor which precedes the conveyor belt, a roller is provided, which extends across the direction of conveyance and is disposed between the conveyor belt and said conveyor and is adapted to be pivotally moved out of their common plane of conveyance, and at least one sensor is provided adjacent to the pivoted roller.

An alternative feature of the invention resides in that the primary feeder comprises a conveyor which immediately precedes the conveyor belt and consists of a plurality of parallel spaced apart round belts, a roller is disposed between said round belts and movable at right angles to the plane of conveyance of the round belts, and at least one sensor is provided adjacent to the movable roller.

According to the invention a mechanically operable sensor consists of a preferably spring-loaded pin, which is adapted to be displaced by the wafer sheet edge and actuates an electric switch.

According to a further feature of the invention the displaceable pin is secured to a rotary shaft, which extends across the direction of conveyance.

A further feature of the invention resides in that the sensor consists of a photoelectric detector, which extends at right angles to the path of conveyance of the wafer sheets. This will be of advantage with photoelectric detectors having a light path extending through the gap between two consecutive wafer sheets.

According to a further feature of the invention the sensor consists of a photoelectric detector which extends at an acute angle to the path of conveyance for the wafer sheets. With that design the wafer sheet edge will be detected over a substantial part of its length and irregularities will be compensated.

According to a further feature of the invention, a plurality of sensors are provided adjacent to the wafer sheet edges to be detected and the sensors are arranged in succession in the direction of conveyance.

These sensors may be arranged in accordance with the spacing of the wafer sheet joints in the respective wafer sheet layers so that the spacing of the wafer sheet joints in one wafer sheet layer can be altered relative to the spacing in the first, lowermost wafer sheet edge in that the distance from the sensor associated with that wafer sheet layer to the sensor associated with the first, lowermost wafer sheet layer is increased. If the positions of the coating heads cannot be changed, the positions of the several sensors can be so adjusted that an exact register of the wafer sheet joints in the several wafer sheet layers can be ensured.

According to a further feature of the invention, a plurality of sensors are provided adjacent to the wafer sheet edges to be registered and the sensors are laterally spaced apart.

IF the sensors are only laterally spaced apart, each wafer sheet edge is detected at the same time by all sensors of a row which is transverse to the direction of conveyance. As a result, a wafer sheet edge will be reliably detected even if it has been broken out to some extent adjacent to one of the sensors, which will then detect that wafer sheet edge some time before the other sensors. If the signal from said sensors triggers the operation of a wafer sheet applicator only when at least two sensors deliver a signal at the same time the broken out wafer sheet edge will not influence the spacing of the wafer sheet joints in the associated wafer sheet layer.

To permit a separate adjustment of the time at which a wafer sheet is deposited by each wafer sheet applicator, it is a feature of the invention that a plurality of sensors are provided adjacent to the wafer sheet edges to be registered and at least one sensor is provided for each wafer sheet applicator.

According to a further feature of the invention the distance from one wafer sheet applicator and particularly its forward stop one or more sensors associated with that wafer sheet applicator and belonging to the primary feeder is an integral multiple of the length of a wafer sheet in the direction of conveyance. That design is particularly desirable in the making of wafer blocks and can be used if the sensors are arranged in accordance with the spacing of the wafer sheet joints of the associated wafer sheet layer.

A further feature of the invention resides in that the distance from a wafer sheet applicator, particularly its forward stop to one or more sensors of the primary feeder is an integral multiple of the length of a wafer sheet in the direction of conveyance less the distance by which the wafer sheets associated with that wafer sheet applicator are offset from those of the first, lowermost wafer sheet layer. This will be particularly desirable if a wafer sheet edge is registered by one sensor or by sensors which are juxtaposed across the direction of conveyance and the resulting signal is used to trigger all wafer sheet applicators.

BRIEF DESCRIPTION OF THE DRAWING

The invention will now be explained more in detail and by way of example with reference to illustrative embodiments of apparatus according to the invention, which are shown in the drawings, in which FIGS. 8 and 9 are top plan views showing respective details of the primary feeder, FIG. 10 is a side elevation showing an additional embodiment of a wafer sheet applicator and FIGS. 11 to 17 show different embodiments of the primary feeder provided according to the invention for the wafer sheets of the first, lowermost wafer sheet layer.

Figure 1:
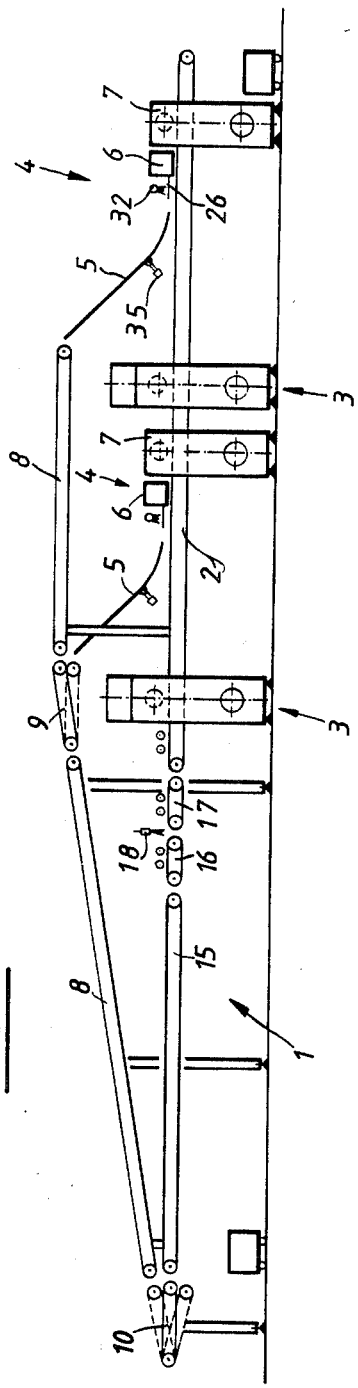
FIG. 1 is a diagrammatic side elevation showing an embodiment of apparatus according to the invention.

The illustrative embodiment of apparatus according to the invention shown in FIG. 1 for making a wafer laminate comprising a primary feeder 1 for supplying wafer sheets to a conveyor belt 2. A plurality of coating heads 3 are provided along the conveyor belt and succeeded by respective wafer sheet applicators 4. In the embodiment shown by way of example only two coating heads 3 succeeded by respective wafer sheet applicators 4 are shown and are used to make a wafer laminate consisting of three wafer sheet layers and two intervening composition layers. It will be understood that more coating heads 3 may be provided in dependence on the number of wafer sheet layers of a wafer laminate consisting of a larger number of layers.

The coating heads 3 may consist of so-called contacting coating heads or of film-applying coating heads. All known designs of such coating heads may be used.

Each coating head 3 is succeeded by a wafer sheet applicator 4, which comprises a wafer sheet feeder 5, a waiting position for the wafer sheets, a wafer sheet-depositin device 6 and a pressure roller 7, which succeeds the device 6. The individual wafer sheets are supplied to the wafer sheet feeder 5 of a given wafer sheet applicator 4 via a conveyor line 8, which has a deflector 9 for the first wafer sheet feeder 5. The conveyor line bridges the coating head and the wafer sheet applicator. The wafer sheet feeder 5 bridges the difference in height between the conveyor line 8 and the wafer sheet depositing device 6. At the beginning of the apparatus shown in FIG. 1, a swivel deck 10 is provided, by which the several wafer sheets coming from wafer sheet supply means which are not shown are delivered to the primary feeder 1 or to the conveyor line 8.

Figure 2:
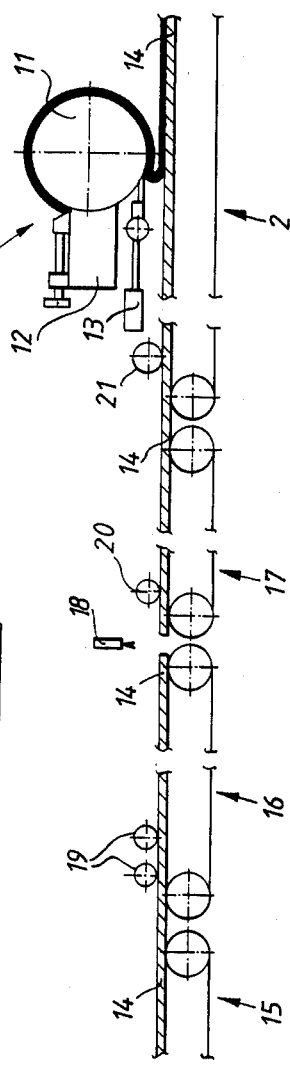
FIG. 2 is a diagrammatic side elevation showing a detail of FIG. 1.

FIG. 2 shows that portion of FIG. 1 which comprises the primary feeder 1 and the first coating head 3. The coating head 3 shown in FIG. 2 is a film-type coating head for caramel-like compositions. In that coating head the composition to be applied is delivered by a feed hopper 12 to a coating roller 11 and is scraped off by a knife 13 and deposited by said knife onto the moving strip of adjoining wafer sheets 14 moving underneath. The conveyor belt 2 is preceded by the primary feeder 1, which consists of a first conveyor 15, a second conveyor 16 and a third conveyor 17, which succeed each other in that order in the direction of conveyance. A photoelectric detector 18 is provided in the transfer region between the second conveyor 16 and the third conveyor 17. Two pressure rollers 19 are provided above the second conveyor 16 and ensure that the wafer sheets lying on the second conveyor 16 will actually move only at the velocity of conveyance of the second conveyor. For the same purpose, a pressure roller 20 is provided above the third conveyor 17 and a pressure roller 21 is provided above the conveyor belt 2.

The first conveyor 15 and the third conveyor 17 are operated at the same speed, which exceeds the speed of the second conveyor 16 and of the belt conveyor 2, which always revolve at the same speed. The three conveyors 15, 16 and 17 may consist of endless conveyor belts, which extend throughout the width of the path of the wafer sheets 14, or may consist of a plurality of narrow conveyor belts, which are juxtaposed across the direction of conveyance.

Figure 3:
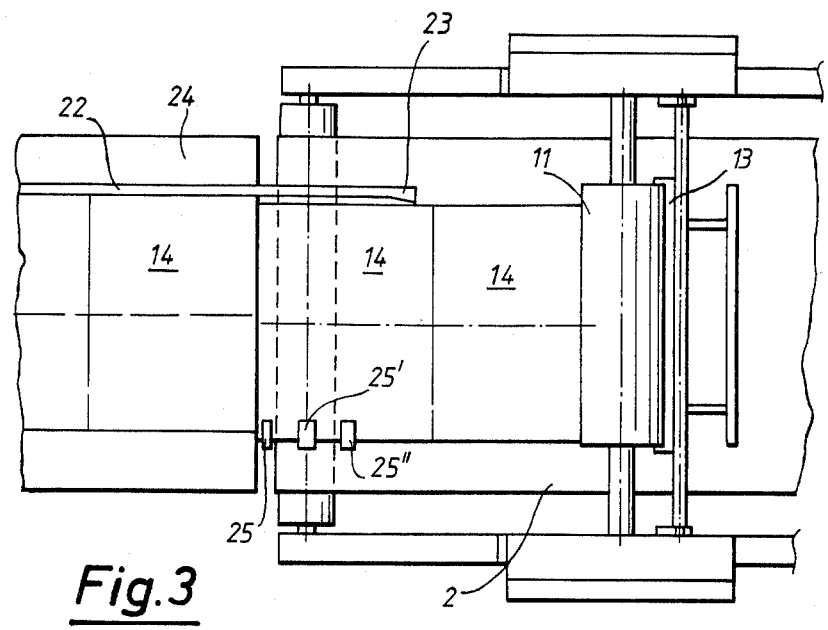
FIG. 3 is a top plan view showing another embodiment of apparatus according to the invention.

FIG. 3 shows another embodiment of the primary feeder 1 and the succeeding film-type coating head 1. To clarify the representation, the coating roller 11 and the scraping knife 13 are the only parts of the film-type coating head which are shown. In this embodiment of the primary feeder 1, a guide bar 22 is attached laterally of the path of the wafer sheets 14 and at its forward end in the direction of conveyance is provided with a wedge 23, which protrudes into the path of the wafer sheets. The guide bar 22 extends along a conveyor belt 24, which precedes the conveyor belt 2. The guide bar 22 protrudes above the conveyor belt 2. The wedge 23 is disposed above the upper course of the conveyor belt 2. A photoelectric detector 25 is disposed in the space between the conveyor belt 24 and the conveyor belt 2 adjacent to the edge of the wafer sheets 14 lying on the conveyor belt 2. The photoelectric detector 25 registers the end edge of each wafer sheet as it moves under the photoelectric detector, specifically that portion of the trailing edge of the preceding wafer sheet which protrudes laterally beyond the succeeding wafer sheet 14. A plurality of sensors 25', 25" spaced apart in the direction of conveyance may be provided above the path of the corners of the wafer sheets and serve to register that portion of the edge of the wafer sheet 14 lying on the conveyor belt 2 which protrudes beyond the succeeding wafer sheet 14.

Figure 4:
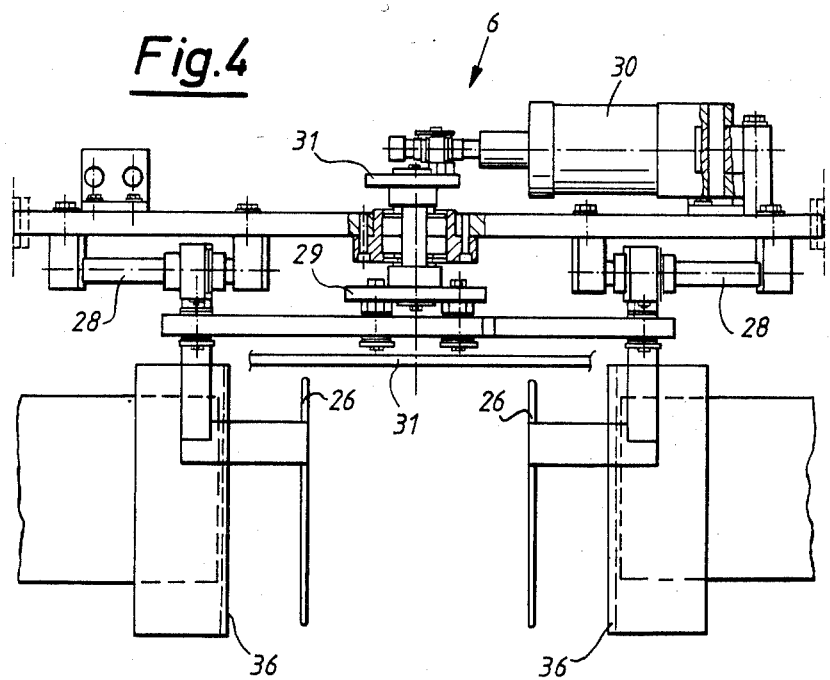
FIGS. 4 and 5 are, respectively, a top plan view and elevation showing an embodiment of the wafer sheet applicator.
Figure 5:
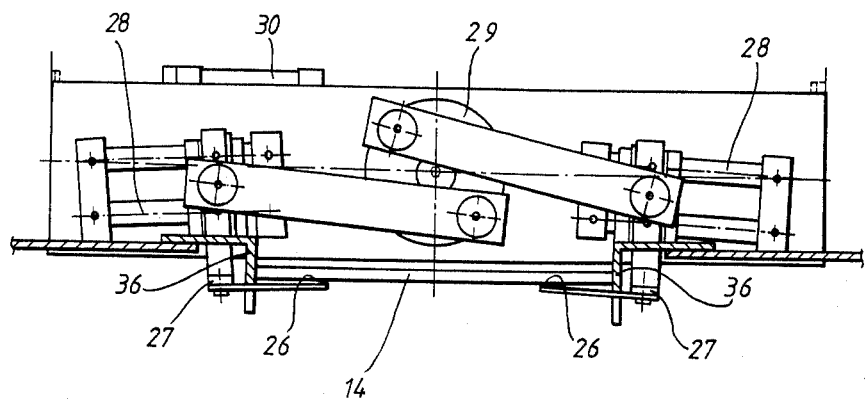
Figure 6:
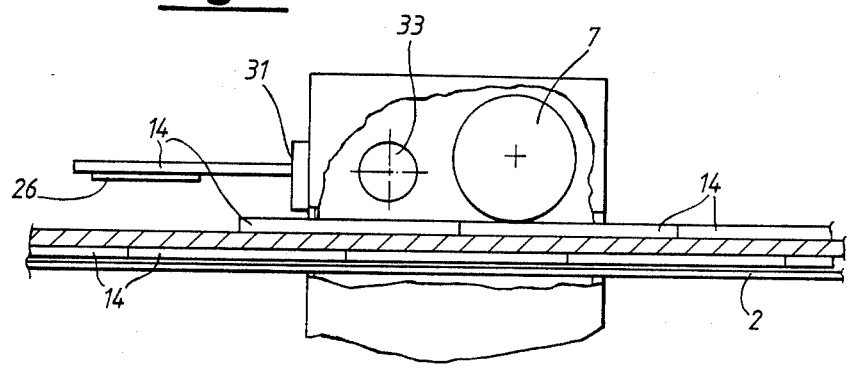
FIGS. 6 and 7 are side elevations showing respective additional embodiments of a wafer sheet applicator.

The wafer sheet-depositing device 6 shown in FIGS. 4 and 5 consists of two fingers 26, which support the wafer sheet 14 in waiting position before it is deposited. These fingers are secured to finger carriers 27, which are mounted on slide tracks 28 and slidable thereon across the direction of conveyance. For a displacement of the two finger carriers 27 across the direction of conveyance of the wafer sheets 14, a lever is pivoted to each finger carrier 27 and is eccentrically connected to a circular disc 29. To reciprocal the finger carriers, the circular disc 29 is rotated by a fluid-operated cylinder 30, which is connected to an eccentric disc 31, which is non-rotatably connected to the circular disc 29.

The wafer sheet-depositing device 6 has a forward stop 31 for engagement by each wafer sheet 14 which is sliding along the wafer sheet feeder 5 and is supported by the fingers 26. The forward stop 31 may be formed, e.g., by the rear wall of the housing of the wafer sheet-depositing device 6 or of a bar which is adjustable in the direction of conveyance. The wafer sheet 14 is guided on its sides in the wafer sheet feeder 5 and in waiting position lies on the fingers 26 and engages the forward stop 31. This ensures an exact alignment of the wafer sheet 14 with the conveyor 2 and the path of the wafer laminate.

One or more compressed-air nozzles 32 (see FIG. 1) may be provided above the fingers 26 and in front of the stop 31, i.e., above the waiting position of the wafer sheets 14, and may serve for a fast and controlled descent of each wafer sheet 14. These nozzles 32 are supplied with compressed air only for short times as the fingers 26 are pulled apart.

The waiting position of the wafer sheet 14 lying on the fingers 26 in the wafer sheet applicator 6 is defined in the direction of conveyance by the forward stop 31 and parallel to the direction of conveyance may be defined by lateral guide bars 36, which extend parallel to the direction of conveyance and can be adjusted transversely to that direction.

When the apparatus shown in FIG. 1 is to be used to make a bond-type wafer sheet laminate, the individual wafer sheets coming from wafer sheet supply means, e.g., a wafer sheet cooler (not shown) or the like, are supplied via the swivel deck 10 to the first conveyor 15 of the primary feeder 1 and are forwarded by the primary feeder to the conveyor belt 2, on which the end edges of the wafer sheets adjoin, and are provided with a composition layer by the first coating head 3 and subsequently conveyed to the first wafer sheet applicator 4. The wafer sheets for the second wafer layer are supplied from the swivel deck 10 via the conveyor line 8 and the deflector 9 to the wafer sheet feeder 5 of the first wafer sheet applicator 4 so that they lie in waiting position on the fingers 26 and are subsequently deposited on the first composition layer. For this purpose the wafer sheet-depositing device 6 is operated so that the fingers 26 are pulled apart across the direction of conveyance and the wafer sheet 14 is dropped. The resulting portion of the wafer laminate is moved to the second coating head 3 under the succeeding pressure roller 7, which forces the second wafer sheet layer against the composition layer. The second coating head 3 applies a second composition layer to the second wafer sheet layer. The wafer sheet layers 14 of the third wafer sheet layer are also supplied via the conveyor line 8 to the wafer sheet feeder 5 of the second wafer sheet applicator 4 and are then applied like the second wafer sheet layer and subsequently forced down by a pressure roller 7. Behind that pressure roller 7, the complete bond-type laminate of wafer sheets, comprising three wafer sheet layers, lies on the conveyor belt 2.

If the photoelectric light detector 18 or 25 measures the trailing edge of the last of the adjoining wafer sheets 14 of the lowermost wafer sheet layer, the distance from the forward stop 31 of each wafer sheet-depositing device 6 to the photoelectric detector 18 or 25 equals an integral multiple of the dimension of the wafer sheet in the direction of conveyance less the distance by which the wafer sheet joint of the wafer sheet layer that is to be formed is offset from the wafer sheet joints of the lowermost wafer sheet layer. In such apparatus according to the invention the wafer sheets are deposited by all wafer sheet-depositing devices 6 at the same time and the offset will be determined by the location of the wafer sheet applicator 4. To permit an adjustment of that offset, each wafer sheet applicator 4 is adjustable along the conveyor belt 2 in the direction of conveyance to an extent which corresponds to one wafer sheet length, i.e., to the length of one wafer sheet in the direction of conveyance. The wafer sheet-depositing devices 6 are triggered by a signal from the photoelectric detector 18 or 25 when the trailing edge of the preceding wafer sheet 14 is spaced such a distance from the respective forward stop 31 that the time required for the travel of the trailing edge to the stop 31 corresponds to the time required for the fall of the wafer sheet 14 to the composition layer so that the leading edge of the wafer sheet 14 will lie immediately behind the trailing edge of the preceding wafer sheet 14.

Alternatively, the distance from each wafer sheet applicator 4 or from the forward stop 31 of each wafer sheet-depositing device 6 to the photoelectric detector 18 or 25 may be selected independently of a multiple of the wafer sheet length. In that case the offset of the wafer sheet joints in each wafer sheet layer from those in the lowermost wafer sheet layer is adjusted by a delay of the signal coming from the photoelectric detector 18 or 25.

For the supply of wafer sheets to the wafer sheet feeders 5 of the wafer sheet applicators 4, a supply of wafer sheets is maintained on the conveyor line 8. For instance, a queuing zone is formed before each wafer sheet feeder 5 as in the primary feeder 1 and a wafer sheet is conveyed from the queuing zone to the wafer sheet feeder whenever the preceding wafer sheet previously held in position in the wafer sheet feeder 5 by a brush 35 or the like has been delivered from the wafer sheet feeder 5 to the waiting position in the wafer sheet-depositing device 6 after the wafer sheet which had been in the waiting position has been deposited on the composition layer. The wafer sheet which has been conveyed by the conveyor line 8 into the wafer sheet feeder 5 is held by the brush 35 in a ready position before arriving at the waiting position in the wafer sheet-depositing device 6.

It will be understood that the wafer sheets required for each wafer sheet layer need not be diverted via the swivel deck 10 from the wafer sheets which are being supplied to the lowermost wafer sheet layer but may be supplied directly to the respective wafer sheet applicator, e.g., from other wafer-baking ovens. For instance, each wafer sheet layer may be assembled from wafer sheets coming from a different wafer-baking oven.

The above and subsequent description will be analogously applicable to the making of an endless wafer laminate of consecutive wafer blocks which are continuously assembled with adjoining end faces and which are interconnected, if desired, by composition webs forming at the butt joints and are otherwise connected only by the composition layers. In that case the offset of the wafer sheets 14 in each additional wafer sheet layer from the wafer sheets 14 of the first, lowermost wafer sheet layer is zero.

Figure 7:
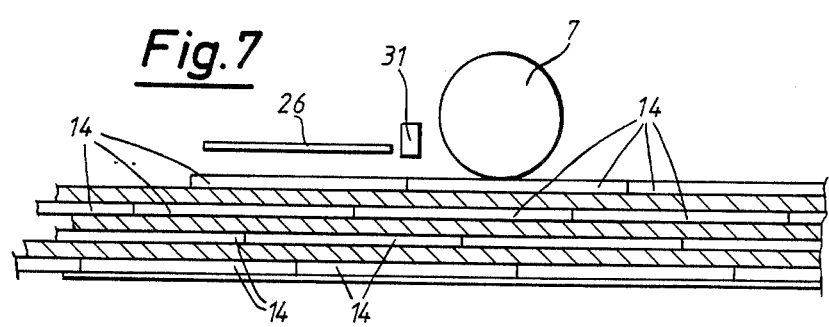

In a variant of the process according to the invention, each wafer sheet 14 is deposited on the adjacent composition layer so as to leave a gap behind the preceding wafer sheet 14 and is then displaced until it engages the preceding wafer sheet. For this purpose each wafer sheet-depositing device 6 is triggered slightly later so that the leading edge of the wafer sheet 14 is spaced from the trailing edge of the preceding wafer sheet 14. The pressure roller 7 which succeeds the wafer sheet-depositing device 6 is driven at a peripheral velocity which slightly exceeds the velocity which would correspond to the velocity of conveyance of the wafer laminate. As a result, the wafer sheet 14 is pushed by the pressure roller 7 into engagement with the preceding wafer sheet 14. As a result, the gap formed between two successive wafer sheets is closed. This is also applicable to a gap which may inadvertently form as a result of differences in length between the wafer sheets (FIG. 7). Alternatively, a spiked roller 33 may be provided behind the wafer sheet-depositing device 6 and in front of the pressure roller 7 and may preferably have only a single row of spikes 34, which penetrate into the upper surface of the wafer sheet 14 that has been deposited on the composition layer by the wafer sheet-depositing device 6. As a result, the spiked roller 33 pushes that wafer sheet on the composition layer in the direction of conveyance into engagement with the preceding wafer sheet 14 so that the gap between the two wafer sheets 14 is closed and the edges of the wafer sheets which constitute the resulting wafer sheet layer adjoin.

As is shown in FIGS. 8 and 9, a plurality of sensors may also be provided at the primary feeder 1 for feeding the wafer sheets 14 for the first, lowermost wafer sheet layer. In the variant shown in FIG. 8, a space is left between the second conveyor 16 and the third conveyor 17 and three photoelectric detectors 18, 18', 18" are provided in that space. Said detectors include two sensors 18, 18", which are disposed at respective paths of corners of the wafer sheets, and one detector 18' is disposed adjacent to the middle of the path of the wafer sheet 14. The three photoelectric detectors 18, 18', 18" are arranged in a row, which extends across the direction of conveyance, so that the detectors detect a wafer sheet edge at the same time.

In the embodiment shown in FIG. 9 the photoelectric detectors 18, 18', 18" are disposed above the second conveyor 16 behind the holding-down roller 19 and above the third conveyor 17 and each photoelectric detector registers the wafer sheet edge lying on the associated conveyor belt.

The photoelectric detectors which are juxtaposed across the direction of conveyance are offset in the direction of conveyance so that each wafer sheet 14 moves past the photoelectric detectors 18, 18', 18" in succession. A wafer sheet applicator 4 is associated with each photoelectric detector and will be triggered when a wafer sheet edge is moving past the associated photoelectric detector.

The sensors for detecting the edges of the wafer sheets of the first, lowermost wafer sheet layer may be spaced apart in and across the direction of conveyance so that the sensors are arranged in a plurality of rows, which are spaced apart in the direction of conveyance and each of which comprises a plurality of juxtaposed sensors. In such an arrangement each row preferably comprises at least three photoelectric detectors and the number of rows depends on the number of wafer sheet applicators. The region covered by these sensors arranged in rows may extend from the holding-down roller 19 of the second conveyor 16 over the third conveyor 17 to the holding-down roller 21 of the conveyor belt 2 because there will always be a gap between two consecutive wafer sheets throughout said region.

In accordance with the invention the gap formed between two consecutive wafer sheets for the first, lowermost wafer sheet layers in order to permit the detection of the wafer sheet edges may alternatively be formed in that consecutive wafer sheets are offset in height.

For this purpose the conveyor belt 2 is preceded by a conveyor which conveys the wafer sheets 14 on a path which is upwardly or downwardly offset, preferably by more than the thickness of a wafer sheet, from the plane of conveyance of the conveyor belt.

The gap resulting from an offsetting of the wafer sheets in height need not be formed immediately before the conveyor belt but may be formed by means of two consecutive transport belts 38, 39 of the primary feeder 1, which are spaced a larger distance from the succeeding conveyor belt 2, opposite to the direction of conveyance. The distance from the point where the gap is formed to the conveyor belt 2 may be bridged by the second transport belt 39 or by an additional transport belt.

Figure 11:
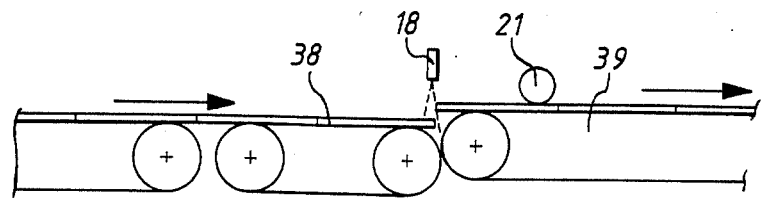

In the illustrative embodiment shown by way of example in FIG. 11, the upper course of the second transport belt 39 is disposed above the upper course of the first transport belt 38.

Figure 12:
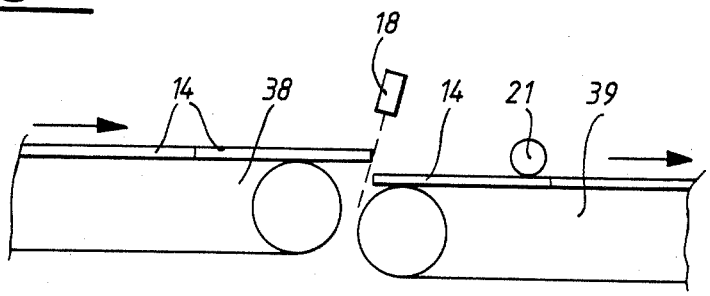

In the illustrative embodiment shown in FIG. 12, the wafer sheet-conveying path of the second transport belt is disposed below the first transport belt 38.

Figure 13:
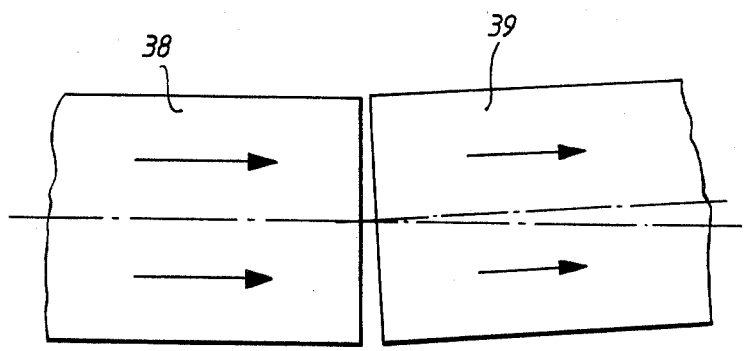

Another variant of the means for forming the gap is shown in FIG. 13. In that variant the second transport belt 39 extends at a small angle to the first transport belt 38 so that a wedge-shaped gap between consecutive wafer sheets will form in the transfer region between the two transport belts. That wedge-shaped gap is closed on the second transport belt 39 by a pressure roller, which revolves slightly faster than the second transport belt. It will be understood that the second transport belt may be constituted by the conveyor belt 2.

For a reliable detection of the wafer sheet edges it is not essential to form between two consecutive wafer sheets a gap extending across the direction of conveyance throughout the dimension of the wafer sheet which is transverse to the direction of conveyance. If the wafer sheets adjoin in a row, it will be sufficient to lift each wafer sheet on one side for a short time so that it will be pivotally moved on an axis which extends in the direction of conveyance and the edge of the pivotally moved wafer sheet can then be registered.

Figure 14:
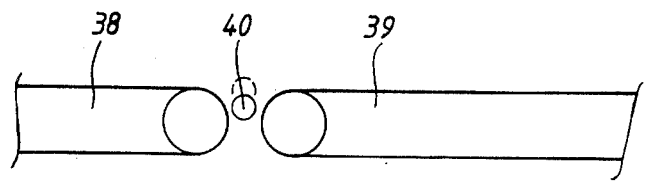

The pivotal movement can be imparted to the wafer sheet by a roller 40, which is disposed between two conveyors 38, 39 and protrudes above the plane of conveyance or can be pivotally moved to such position so that each wafer sheet moving past the roller 40 will be pivotally moved out of the plane of conveyance (FIG. 14).

Figure 15:
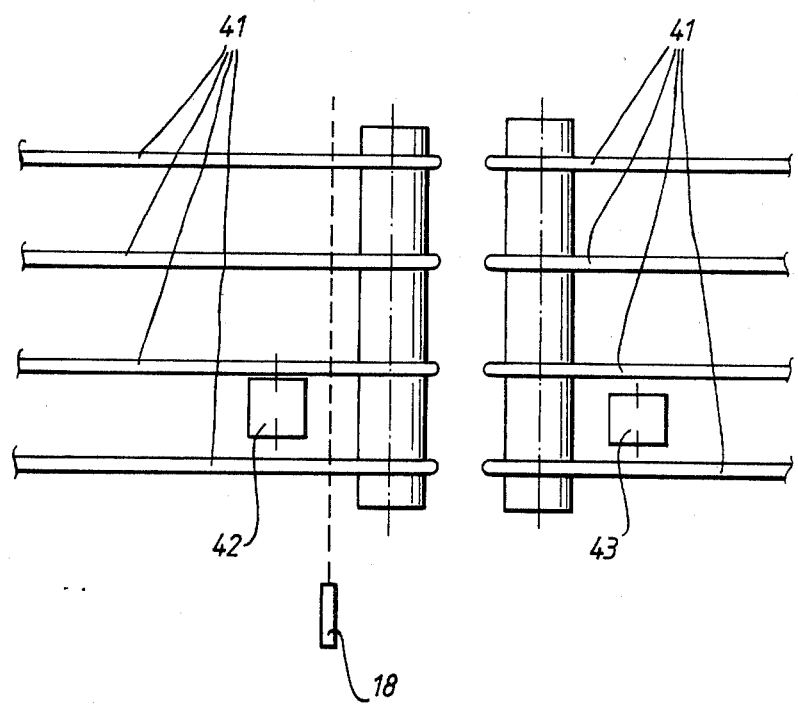
Figure 16:
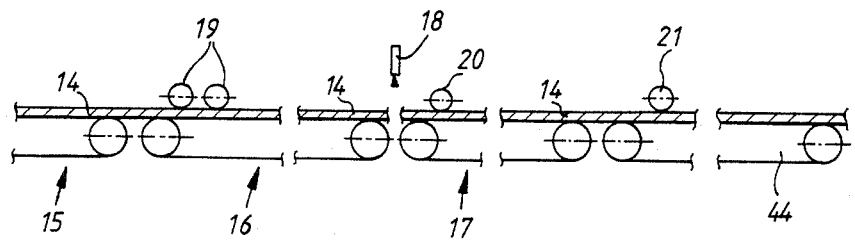

If conveyors consisting of round belts 41 are used, a roller 42 is provided between the round belts 41 and said roller can be lifted above and lowered below the path of conveyance of the wafer sheets by means of a pneumatic cylinder (not shown) or the like. The displacement of the roller 42 is controlled by a counting wheel 43, which measures the length of the wafer sheet in the direction of conveyance. This will ensure that each wafer sheet will be turned out of the plane of conveyance only once (FIG. 15). That roller may be stationary if it protrudes above the plane of conveyance and lifts one side of each wafer sheet as it moves past the roller.

The primary feeder 1 shown in FIG. 2 forms by means of the third conveyor 17 a gap between two consecutive wafer sheets immediately before the conveyor belt 2 and may be spaced a larger distance from the conveyor belt 2 opposite to the direction of conveyance. That variant differs from that shown in FIG. 2 only in that the conveyor belt 2 is replaced by a fourth conveyor 44.

Figure 17:
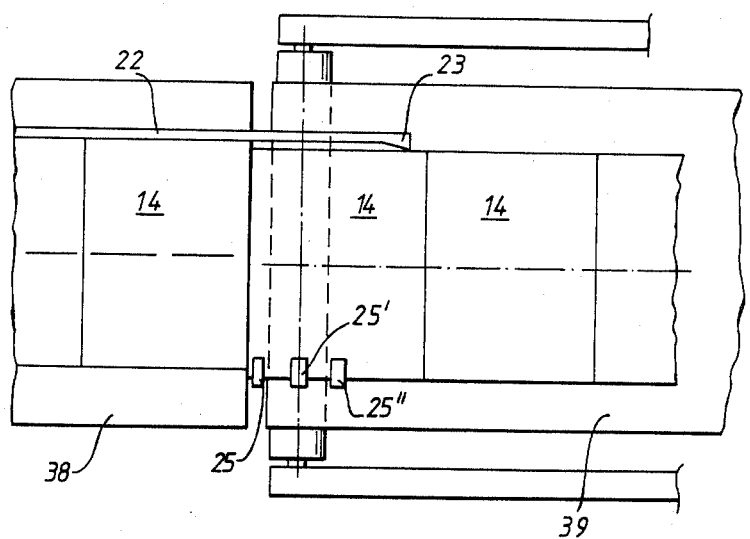

The primary feeder shown in FIG. 17 differs from the one shown in FIG. 3 only in that the conveyor belt 2 has been replaced by a second conveyor 39.

The sensors for registering the wafer sheet edges may consist of spring-loaded pins, which are adapted to be displaced by the associated wafer sheet edge and actuate an associated electric switch. These pins may be secured to shafts, which extend across the direction of conveyance and are rotated by each wafer sheet to move the pins out of the paths of the wafer sheet.

Alternatively, the sensors may consist of clearance-dependent photoelectric detectors, which extend preferably at right angles to the path of the wafer sheets and above the same adjacent to the gap between two successive wafer sheets or adjacent of the offset wafer sheet edges. These clearance-dependent photoelectric detectors detect only the wafer sheet edges moving past the photoelectric detector at a certain distance therefrom.

The sensors may alternatively consist of photoelectric detectors which extend along the wafer sheet edge which is to be registered and extend at an acute angle to the path of conveyance of the wafer sheets and at right angles to the direction of conveyance and cover a larger length of the respective wafer sheet edge so that any broken-out portion of the wafer sheet edge will not affect the generation of the signal by the sensor.

In one embodiment of the invention the wafer sheet applicator 4 has a waiting position which is defined by two movable, lateral guide bars 36, a forward stop 31 and a rear stop 37. Each of the two lateral guide bars 36 and of the two bars 31, 37 is reciprocable between a receiving position and a locating position. The wafer sheet remaining in the waiting position is located across the direction of conveyance by the lateral guide bars 36 in their locating position and in the direction of conveyance by the two stops in their locating position. In the receiving position, the spacings of the guide bars 36 and of the stops 31, 37 exceed the respective dimensions of the wafer sheet.

The movable lateral guide bars 36 may have projection which extend laterally under the wafer sheets remaining in the waiting position.

The lateral guide bars 36 constitute the wafer sheet-depositing device and are pivotally movable about axes which are parallel to the direction of conveyance.

The lateral guide bars 36 and the stops 31, 37 are so controlled that they engage the wafer sheet remaining in the waiting position until the fingers 26 are pulled apart or the guide bars 36 are pivotally moved to drop the wafer sheet. Thereafter the guide bars 36 and the stops 31, 37 are moved apart to their receiving positions.

The sensors for registering the wafer sheet edges may desirably have relative to each other an arrangement which agrees with the arrangement of the sensors in the wafer sheet-testing line adjacent to the wafer sheet cooler. In that wafer sheet-testing line, e.g., three juxtaposed sensors are provided, which cause a defective wafer sheet to be rejected unless all three sensors register the associated wafer sheet edge at the same time. This agreement of the sensor arrangements ensures that each sensor of the primary feeder for the wafer sheets of the first, lowermost wafer sheet layer will register a wafer sheet edge because that wafer sheet edge has already been registered by the sensor in the testing line.

We claim:

1. An apparatus for the continuous production of an endless wafer sheet laminate of uniform width, which comprises a first, lowermost layer of consecutive rectangular wafer sheets and superposed, additional and alternating layers of coating composition and consecutive rectangular wafer sheets, the layers extending in a longitudinal direction of the laminate and each one of the wafer sheets having a leading and a trailing edge extending transversely to said direction, the apparatus comprising (a) a conveyor belt for the wafer sheet laminate, the conveyor belt moving in said direction and the first, lowermost layer of consecutive rectangular wafer sheets lying on the conveyor belt with the trailing and leading edges of the consecutive wafer sheets adjoining,
  (b) a primary feeder preceding said conveyor belt in said direction and supplying the wafer sheets of the first, lowermost layer to the conveyor belt, the primary feeder including
   (1) sensor means sensing one of said edges of each one of the wafer sheets of the first, lowermost layer,
  (c) a plurality of coating heads succeeding each other in said direction and disposed above said conveyor belt for applying the composition layers to respective ones of the wafer sheets, (d) a plurality of wafer sheet applicators for applying the wafer sheets of a respective one of the superposed, additional layers to an uncovered, underlying one of the layers of the coating composition of a previously formed portion of the wafer laminate, the applicators being disposed above said conveyor belt and succeeding respective ones of the coating heads in said direction, each one of the applicators
  (1) defining a station disposed above an uncovered uppermost one of said composition layers of the previously formed portion of the wafer laminate and being arranged to drop a respective one of the wafer sheets at said station onto the uncovered uppermost composition layer at a time determined by the sensing of said one edge of a respective one of the wafer sheets of the first, lowermost layer by said sensing means, and
  (2) includes a wafer sheet feeder for supplying successive ones of the wafer sheets of the superposed, additional layers to said station, and
(e) a plurality of pressure rollers disposed above the conveyor belt and succeeding respective ones of the applicators in said direction for pressing the respective wafer sheets dropped onto the uncovered uppermost composition layers thereagainst.

2. The apparatus of claim 1, further comprising a common conveyor line for the wafer sheets of the superposed, additional layers, the common conveyor line leading to the wafer sheet feeders of all wafer sheet applicators for supplying the wafer sheets to the applicators.

3. The apparatus of claim 2, wherein the common conveyor line constitutes a wafer sheet storage for the wafer sheets of the superposed, additional layers.

4. The apparatus of claim 2, further comprising a common wafer sheet supply supplying wafer sheets to the primary feeder and the common conveyor line.

5. The apparatus of claim 1, wherein each applicator further comprises a wafer sheet depositing device including wafer sheet retaining means for retaining the respective wafer sheet in said station, the retaining means being disposed below said wafer sheet and above the uncovered uppermost composition layer, and being retractible transversely to said direction.

6. The apparatus of claim 5, wherein each applicator further includes a spiked roller succeeding the wafer sheet depositing device in said direction and arranged to engage the wafer sheet dropped onto the uncovered uppermost composition layer.

7. The apparatus of claim 6, wherein the spiked roller has a single row of spikes.

8. The apparatus of claim 1, wherein each applicator further includes lateral guide bars extending in said direction and a forward stop extending transversely to said direction for defining said station for each one of the wafer sheets to be dropped.

9. The apparatus of claim 8, wherein the lateral guide bars form part of the wafer sheet feeder.

10. The apparatus of claim 8, wherein the lateral guide bars are movable between a receiving position and a locating position, the spacing between the guide bars transversely to said direction exceeding the length of said wafer sheet edges in the receiving position and said spacing corresponding to said length in the locating position, the guide bars exactly defining the lateral position of the respective wafer sheets in the locating position.

11. The apparatus of claim 8, wherein the lateral guide bars are pivotal about axes extending parallel to said direction and include projections laterally subtending the respective wafer sheets in the locating position, and the pivotal guide bars constituting a wafer sheet depositing device moving each wafer sheet to the uncovered uppermost composition layer.

12. The apparatus of claim 8, wherein said forward stop is adjustable in said direction.

13. The apparatus of claim 8, further comprising a rear stop defining said station at a rear end thereof.

14. The apparatus of claim 13, wherein the stops are movable between a receiving position and a locating position, the spacing between the stops in said direction exceeding the extension of said wafer sheet in said direction in the receiving position and said spacing corresponding to said extension in the locating position, the stops exactly defining the position of the respective wafer sheet in said direction in the locating position.

15. The apparatus of claim 1, wherein the pressure rollers have a peripheral velocity exceeding the conveying speed of the conveyor belt.

16. The apparatus of claim 1, wherein the primary feeder includes a transport device transporting the wafer sheets with the adjoining edges to the conveyor belt.

17. The apparatus of claim 16, further comprising a lateral guide for the wafer sheets disposed above the transport device and extending therealong in said direction, the lateral guide having a portion extending over the conveyor belt and defining a conveyor path for the wafer sheets laterally offset from a conveyor path of the wafer sheets on the conveyor belt, the lateral guide portion carrying a wedge protruding laterally into the laterally offset path and displacing the wafer sheets with the adjoining edges from the laterally offset path into the path of the wafer sheets on the conveyor belt, the wafer sheets forming a queue on the transport device before they form the first, lowermost layer, and at least one sensor disposed above the path of the wafer sheet corners in the region of the lateral displacement of the wafer sheets with the adjoining edges for sensing any lateral displacement of the adjoining edges relative to each other in the region of the wafer sheet corners.

18. The apparatus of claim 16, wherein said transport device defines a conveyor path for the wafer sheets vertically offset from a path of the wafer sheets on the conveyor belt, and further comprising at least one sensor in the region of the vertical offset for sensing any adjoining edges vertically offset relative to each other.

19. The apparatus of claim 16, wherein the transport device defines a conveyor path for the wafer sheets coplanar with the conveyor path of the conveyor belt supporting the wafer sheet laminate but disposed at an angle to said direction, the wafer sheets forming a queue on the transport device before they form the first, lowermost layer, and at least one sensor disposed at facing ends of the transport device and the conveyor belt for sensing the edges of the consecutive wafer sheets arranged at an angle to each other.

20. The apparatus of claim 16, wherein the transport device defines a conveyor path for the wafer sheets corresponding to the conveyor path of the first, lowermost layer on the conveyor belt, the wafer sheets accumulating on the transport device before they form the first, lowermost layer, further comprising a roller disposed between facing ends of the transport device and the conveyor belt, the roller being pivotal transversely to said direction out of said conveyor path, and at least one sensor in the region of the pivotal roller for sensing the edges of the consecutive wafer sheets.

21. The apparatus of claim 16, wherein the transport device includes a plurality of parallel, spaced apart round belts defining a common plane of conveyance for the wafer sheets, the wafer sheets forming a queue on the transport device before they form the first, lowermost layer, further comprising a roller between the round belts and disposed perpendicularly movably to the plane of conveyance, and at least one sensor in the region of said roller for sensing the edges of the consecutive wafer sheets.

22. The apparatus of claim 1, wherein the primary feeder for the wafer sheets of the first, lowermost layer includes two consecutive transport devices for transporting the wafer sheets with the adjoining edges.

23. The apparatus of claim 22, further comprising a lateral guide for the wafer sheets disposed above the transport devices and extending therealong in said direction, the lateral guide defining a first conveyor path for the wafer sheets along a first one of the transport devices and having a portion extending over a second one of the transport devices, the lateral guide portion carrying a wedge protruding laterally into the first conveyor path and laterally displacing the wafer sheets with the adjoining edges on the second transport device into a second, laterally offset conveyor path, the wafer sheets forming a queue on the transport devices before they form the first, lowermost layer, and at least one sensor disposed above the path of the wafer sheet corners in the region of the lateral displacement of the wafer sheets with the adjoining edges for sensing any lateral displacement of the adjoining edges relative to each other in the region of the wafer sheet corners.

24. The apparatus of claim 22, wherein the transport devices define two vertically offset conveyor paths for the wafer sheets, and further comprising at least one sensor in the region of the vertical offset for sensing the edges of vertically offset consecutive wafer sheets.

25. The apparatus of claim 22, wherein the transport devices define two coplanar conveyor paths for the wafer sheets disposed at an angle to each other, the wafer sheets forming a queue on the transport devices before they form the first, lowermost layer, and further comprising at least one sensor disposed at facing ends of the transport devices for sensing the edges of the consecutive wafer sheets arranged at an angle to each other.

26. The apparatus of claim 22, wherein the transport devices define two coplanar conveyor paths for the wafer sheets, the wafer sheets forming a queue on the transport devices before they form the first, lowermost layer, further comprising a roller disposed between facing ends of the transport devices, the roller being pivotal transversely to said direction out of said common conveyor paths, and at least one sensor in the region of the pivotal roller for sensing the edges of the consecutive wafer sheets.

27. The apparatus of claim 1, wherein the primary feeder comprises three consecutive transport devices, an intermediate one of the consecutive transport devices having the same velocity of conveyance as the conveyor belt and the first and third consecutive transport devices having a velocity of conveyance exceeding that of the conveyor belt, further comprising at least one holding-down roller for the wafer sheets disposed above the intermediate transport device and the conveyor belt, the holding-down roller disposed above the intermediate transport device braking the wafer sheets coming from the first transport device to form a first queue of wafer sheets on the first transport device, and the holding-down roller disposed above the conveyor belt braking the wafer sheets coming from the third transport device to form a second queue of wafer sheets on the third transport device before the wafer sheets form the first, lowermost layer, and at least one sensor disposed to sense the edges of the consecutive wafer sheets in a gap formed between the first and second queues of the wafer sheets due to the difference in the velocities of conveyance of the intermediate and third transport devices.

28. The apparatus of claim 27, comprising a plurality of said holding-down rollers above the intermediate transport device and the conveyor belt, and said at least one sensor being disposed between a last one of said holding-down rollers above the intermediate transport device and a first one of said holding-down rollers above the conveyor belt, in said direction.

29. The apparatus of claim 1, wherein the primary feeder comprises four consecutive transport devices, a second and fourth one of the consecutive transport devices, in said direction, having the same velocity of conveyance as the conveyor belt and the first and third consecutive transport devices having a velocity of conveyance exceeding that of the conveyor belt, further comprising at least one holding-down roller for the wafer sheets disposed above the second and fourth transport devices, the holding-down roller disposed above the second transport device braking the wafer sheets coming from the first transport device to form a first queue of wafer sheets on the first transport device, and the holding-down roller disposed above the fourth transport device braking the wafer sheets coming from the third transport device to form a second queue of wafer sheets on the third transport device before the wafer sheets form the first, lowermost layer, and at least one sensor disposed to sense the edges of the consecutive wafer sheets in a gap formed between the first and second queues of the wafer sheets due to the difference in the velocities of conveyance of the second and third transport devices.

30. The apparatus of claim 29, comprising a plurality of said holding-rollers above the second and fourth transport devices, and said at least one sensor being disposed between a last one of said holding-down rollers above the second transport device and a first one of said holding-down rollers above the fourth transport device, in said direction.

31. The apparatus of claim 1, wherein the sensor comprises a sensing pin displaceable by the sensed wafer sheet edge and an electric switch actuated by the displaced pin.

32. The apparatus of claim 31, further comprising a rotary shaft extending transversely to said direction, the sensing pin being secured to the rotary shaft.

33. The apparatus of claim 1, wherein the sensor comprises a photoelectric detector extending perpendicularly to the path of conveyance of the wafer sheets.

34. The apparatus of claim 1, wherein the sensor comprises a photoelectric detector extending at an acute angle to the path of conveyance of the wafer sheets.

35. The apparatus of claim 1, comprising a plurality of said sensors arranged consecutively in said direction.

36. The apparatus of claim 1, comprising a plurality of said sensors laterally offset relative to each other.

37. The apparatus of claim 1, comprising a plurality of said sensors laterally offset relative to each other laterally and spaced from each other in said direction.

38. The apparatus of claim 1, comprising a plurality of said sensors, at least one of said sensors being associated with each one of the wafer sheet applicators.

39. The apparatus of claim 38, wherein each sensor associated with a respective applicator is spaced therefrom a distance corresponding to an integral multiple of the extension of the wafer sheets in said direction.

40. The apparatus of claim 1, wherein the wafer sheets of the superposed, additional layers are offset in said direction from the wafer sheets of the first, lowermost layer, and comprising a plurality of said sensors, at least one of the sensors being associated with each one of the wafer sheet applicators and each sensor associated with a respective applicator is spaced therefrom a distance corresponding to an integral multiple of the extension of the wafer sheets in said direction less the extent of the offset of the wafer sheets applied by the respective applicator relative to the wafer sheets of the first, lowermost layer.

41. The apparatus of claim 1, wherein each wafer sheet applicator is adjustable along the conveyor belt in said direction.

* * * * *